No. 887,460. PATENTED MAY 12, 1908.
S. A. BUXTON.
ANIMAL CATCHER.
APPLICATION FILED FEB. 16, 1907.
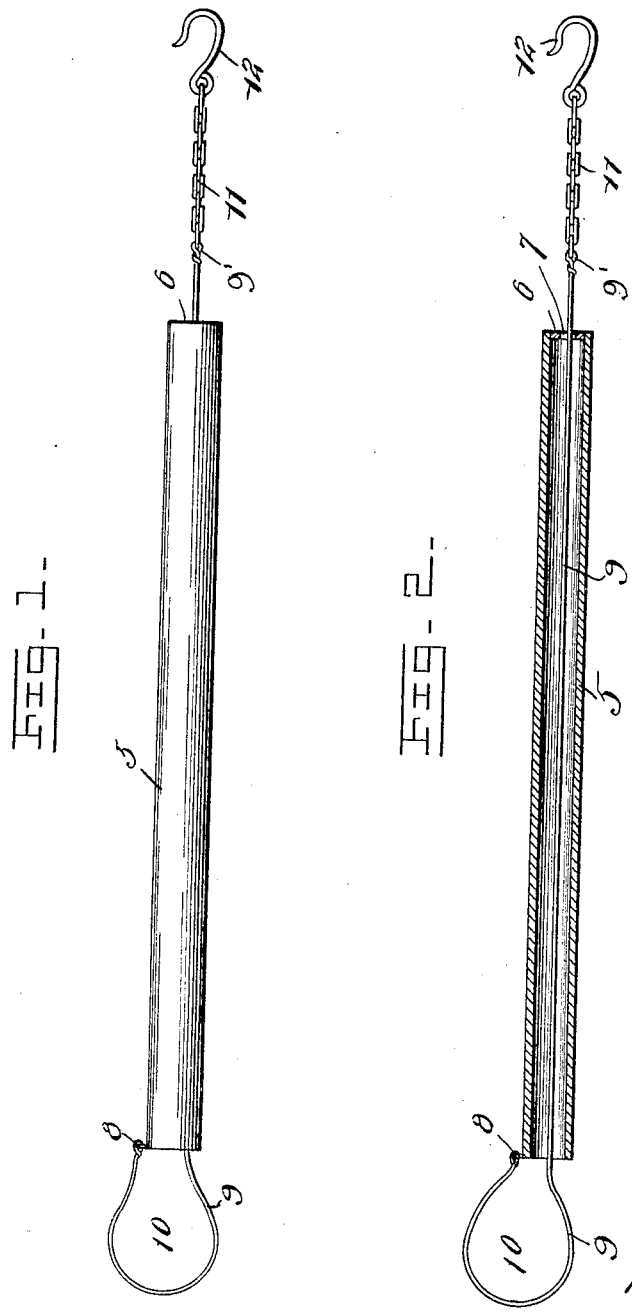

UNITED STATES PATENT OFFICE.

SINGLETON A. BUXTON, OF MONTEZUMA, OHIO.

ANIMAL-CATCHER.

No. 887,460.　　　　Specification of Letters Patent.　　　Patented May 12, 1908.

Application filed February 16, 1907. Serial No. 357,726.

*To all whom it may concern:*

Be it known that I, SINGLETON A. BUXTON, a citizen of the United States, residing at Montezuma, in the county of Mercer and State of Ohio, have invented certain new and useful Improvements in Animal-Catchers, of which the following is a specification.

This invention relates to animal catchers and more particularly to those designed for catching hogs, and has for its object to provide a catcher which will be extremely simple and cheap while being durable and efficient.

Other objects and advantages will be apparent from the following description and it will be understood that changes in the specific construction shown and described may be made within the scope of the claims without departing from the spirit of the invention.

In the drawings forming a portion of this specification and in which like numerals of reference indicate similar parts in the several views—Figure 1 is an elevational view of the invention, Fig. 2 is a longitudinal section of the invention.

Referring now to the drawings, the present invention comprises a handle 5, formed of a piece of pipe of suitable size, and having a cap 6 at one end, this cap being provided with an opening 7. The opposite end of the handle carries a laterally extending staple 8, and to this staple there is secured one end of a wire 9, which is turned to extend into the handle 5 and therethrough, passing out through the opening 7. There is thus formed a loop 10 in the wire at the forward end of the catcher, for a purpose which will be presently described.

Beyond the cap 6, the wire 9 is twisted to form an eye 9′, to which is attached a short chain 11, provided with a hook 12, and it will be seen that when it is desired to catch a hog or similar animal, the loop 10 may be engaged over the animal's nose, and the wire then drawn tight through the handle 5 to prevent the escape of the animal. The chain 11 may be engaged around a tree or post, or through a ring, and the hook 12 engaged in a link of the chain, as will be understood, to hold the animal if desired.

What is claimed is:

An animal catcher comprising a handle formed of a pipe section and having an outwardly and laterally extending staple at one end, a cap engaged with the opposite end of said section and having an opening therein, the opening being arranged in the center of the cap, a wire connected at one end with the staple and turned to form an animal engaging loop, the free end of the wire being extended through the pipe and through the opening in the cap, said wire being twisted at its end outwardly of the cap to form an eye, a chain secured to the eye and a hook carried by the outer end of the chain and arranged for engagement at times with the links of the chain.

In testimony whereof I affix my signature in presence of two witnesses.

SINGLETON A. BUXTON.

Witnesses:
　JOHN SCHELL,
　J. J. ULRICH.